Figure 3:
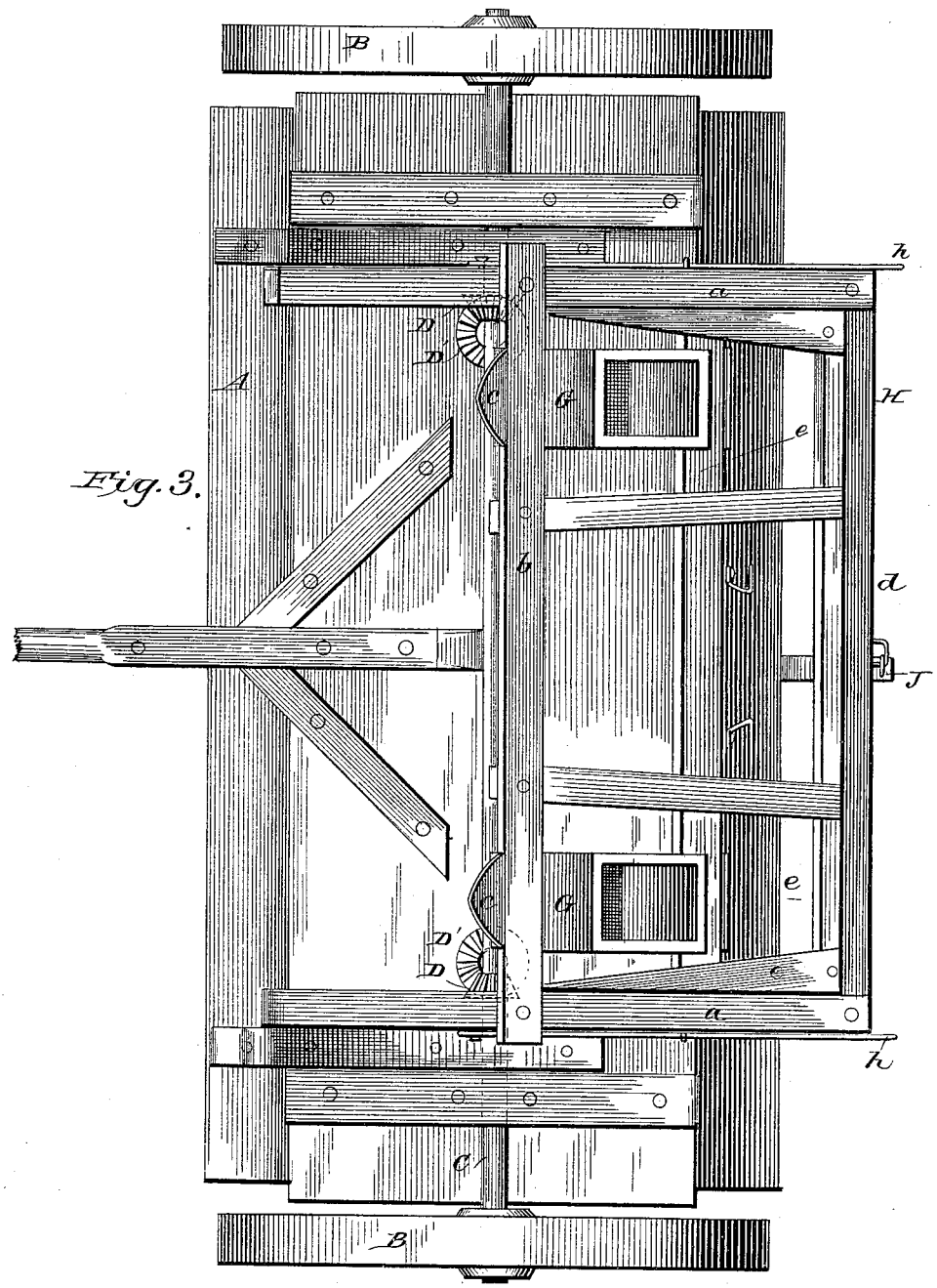

(No Model.) 2 Sheets—Sheet 1.
J. H. PRIESTLEY.
POTATO PLANTER.
No. 386,349. Patented July 17, 1888.
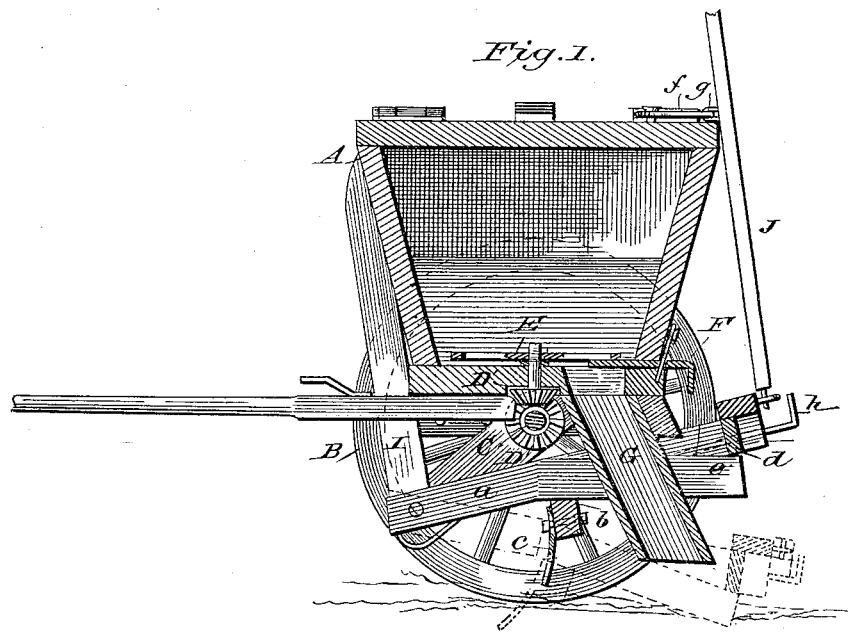
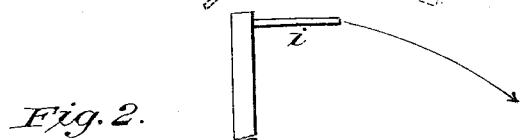
WITNESSES:
Fred G. Dieterich
Edw. W. Byrn
INVENTOR:
J. H. Priestley
BY Munn & Co
ATTORNEYS.

(No Model.) 2 Sheets—Sheet 2.

J. H. PRIESTLEY.
POTATO PLANTER.

No. 386,349. Patented July 17, 1888.

WITNESSES:
Fred G. Dieterich.
Edw. W. Byrn.

INVENTOR:
J. H. Priestley
BY Munn & Co
ATTORNEYS.

UNITED STATES PATENT OFFICE.

JOHN HENRY PRIESTLEY, OF MERIDEN, IOWA, ASSIGNOR OF ONE-HALF TO JOHN L. CHAPIN, OF SAME PLACE.

POTATO-PLANTER.

SPECIFICATION forming part of Letters Patent No. 386,349, dated July 17, 1888.

Application filed March 6, 1888. Serial No. 266,378. (No model.)

*To all whom it may concern:*

Be it known that I, JOHN HENRY PRIESTLEY, of Meriden, in the county of Cherokee and State of Iowa, have invented a new and useful Improvement in Potato-Planters, of which the following is a specification.

The object of my invention is to provide a device for planting potatoes economically, rapidly, and evenly, in straight rows, so that they can be easily cultivated and dug up when mature; and to this end it consists in a special form of planter, which I will now proceed to fully describe with reference to the drawings, in which—

Figure 1 is a vertical transverse section. Fig. 2 is a rear view, and Fig. 3 an inverted plan view.

A represents a hopper-shaped box for containing the seed-potatoes, which box has a partition midway its length that divides the box into two compartments, each of which is provided with the duplicate seeding devices in its bottom.

B B are the wheels of the planter, which are rigidly keyed to the revolving metal axle C, which carries two bevel-wheels, D D, that engage with two bevel-wheels, D' D', at the bottom of each seed-compartment. These bevel-wheels D' are fixed to short shafts that extend up into the interior of the seed-boxes, and carry disks E, of sheet metal, which have openings in them, and which openings, as the disks revolve, pass over an opening in the bottom of the seed-box and allow a definite number of seed potatoes to drop through. The size of this hole may be regulated by a gage-slide, F, so as to drop a greater or less quantity. From the hole at the bottom of each seed-box there extends a tube, G, that leads the seed potatoes to the furrow opened in the earth.

H is a coverer-frame. This is composed of end bars, $a\ a$, whose forward ends are hinged or pivoted to downward projections I from the box. Underneath these bars $a\ a$, and fastened to them, there is a longitudinal bar, $b$, having adjustable shovels or furrow-openers $c$ attached to it, one in front of each feed-tube. At the back end of bars $a\ a$ and on top of the same is another longitudinal bar, $d$, and between $b$ and $d$ and upon opposite side of the feed-tube are secured the covering-bars $e\ e$, which converge toward the rear, and serve, when dragged over the ground by the forward movement of the machine, to cover the potatoes dropped into the furrow.

To the middle of the coverer-frame is loosely connected a bar, J, which acts both as a support for the coverer-frame and a marker to indicate the line for the next row of potatoes. When used to hold the coverer-frame up and away from the ground when the seeder is not in action, the bar J is turned into a vertical position, as in Figs. 1 and 2, and a hook, $f$, on the top of the box is made to pass through an eye, $g$, of this bar and hold it in this position. When used as a marker, the bar J is turned down to a horizontal position, and it drops into the embrace of hooked metal spring-supports $h$ at either end of the coverer-frame, and in this position, as shown by the dotted lines, a tooth or projection, $i$, at its outer end marks a line in the ground to indicate the path of the machine in the next trip across the field, so as to get the rows parallel and the same distance apart.

Having thus described my invention, what I claim as new is—

1. The combination, with the seeder, of a hinged coverer, a bar, J, loosely jointed to the middle of the coverer-frame, and having a marking-tooth, $i$, and a hook-and-eye connection with the box for sustaining the coverer in elevated position, and supports arranged on the ends of the coverer-frame for sustaining the bar when turned down for use as a marker, substantially as shown and described.

2. The combination, with the seed-box, having the downward projections I and the spouts G, of the coverer H, hinged to the projections, and composed of end bars, $a\ a$, longitudinal bar $b$, with shovels $c$, longitudinal bar $d$, and covering-bars $e\ e$, converging to the rear, substantially as and for the purpose described.

JOHN HENRY PRIESTLEY.

Witnesses:
WM. B. CHICK,
O. GAGE.